United States Patent
Neumann et al.

(10) Patent No.: US 9,785,492 B1
(45) Date of Patent: Oct. 10, 2017

(54) TECHNIQUE FOR HYPERVISOR-BASED FIRMWARE ACQUISITION AND ANALYSIS

(71) Applicant: Raytheon Company, Waltham, MA (US)

(72) Inventors: Matthew D. Neumann, Rowlett, TX (US); Irby J. Thompson, Jr., Washington, DC (US); Michael Simms, Indialantic, FL (US)

(73) Assignee: Forcepoint LLC, Austin, TX (US)

( * ) Notice: Subject to any disclaimer, the term of this patent is extended or adjusted under 35 U.S.C. 154(b) by 208 days.

(21) Appl. No.: 14/101,130

(22) Filed: Dec. 9, 2013

(51) Int. Cl.
   *G06F 11/00* (2006.01)
   *G06F 11/07* (2006.01)
   *G06F 11/14* (2006.01)
   *G06F 11/20* (2006.01)

(52) U.S. Cl.
   CPC ...... *G06F 11/0712* (2013.01); *G06F 11/1479* (2013.01); *G06F 11/2023* (2013.01)

(58) Field of Classification Search
   USPC .................................. 714/36; 726/4
   See application file for complete search history.

(56) References Cited

U.S. PATENT DOCUMENTS

| | | | | |
|---|---|---|---|---|
| 7,219,219 | B1 * | 5/2007 | Wisor | 713/1 |
| 8,826,273 | B1 * | 9/2014 | Chen | 718/1 |
| 8,910,238 | B2 * | 12/2014 | Lukacs et al. | 726/1 |
| 2005/0086523 | A1 * | 4/2005 | Zimmer et al. | 713/201 |
| 2006/0053492 | A1 | 3/2006 | Wallace | |
| 2009/0007100 | A1 | 1/2009 | Field et al. | |
| 2009/0119538 | A1 * | 5/2009 | Scales et al. | 714/6 |
| 2009/0300076 | A1 | 12/2009 | Friedman et al. | |
| 2010/0088745 | A1 | 4/2010 | Song et al. | |
| 2010/0281273 | A1 | 11/2010 | Lee et al. | |
| 2011/0047543 | A1 | 2/2011 | Mohinder | |
| 2011/0072254 | A1 * | 3/2011 | Kuang | G06F 9/4403 713/2 |
| 2011/0082962 | A1 | 4/2011 | Horovitz et al. | |
| 2011/0185417 | A1 | 7/2011 | Zhou et al. | |
| 2011/0197205 | A1 | 8/2011 | Wagner et al. | |
| 2011/0265081 | A1 | 10/2011 | Lucovsky et al. | |
| 2011/0265182 | A1 * | 10/2011 | Peinado et al. | 726/24 |
| 2011/0302415 | A1 | 12/2011 | Ahmad et al. | |
| 2012/0011509 | A1 | 1/2012 | Husain | |
| 2012/0030672 | A1 | 2/2012 | Zygmuntowicz et al. | |
| 2012/0255010 | A1 | 10/2012 | Sallam | |

(Continued)

OTHER PUBLICATIONS

Final Office Action dated Feb. 2, 2016 in connection with U.S. Appl. No. 14/101,257; 14 pages.

(Continued)

*Primary Examiner* — Kamini Patel (57) ABSTRACT

A method includes detecting a triggering event at a hypervisor, where the hypervisor is executed by a computing node. The method also includes capturing, from a memory device of the computing node using the hypervisor, one or more images of a basic input/output system (BIOS) of the computing node and/or a firmware of the computing node. The method further includes analyzing the one or more images to detect a problem with the computing node and taking at least one action in response to detecting the problem with the computing node. The one or more images are obtained by the hypervisor directly from the memory device.

20 Claims, 3 Drawing Sheets

(56) References Cited

U.S. PATENT DOCUMENTS

| | | | | |
|---|---|---|---|---|
| 2012/0266209 | A1* | 10/2012 | Gooding et al. | 726/1 |
| 2012/0266231 | A1 | 10/2012 | Spiers et al. | |
| 2012/0266252 | A1 | 10/2012 | Spiers et al. | |
| 2012/0324236 | A1 | 12/2012 | Srivastava et al. | |
| 2013/0061096 | A1* | 3/2013 | McCoy | 714/45 |
| 2013/0232486 | A1 | 9/2013 | Chen et al. | |
| 2013/0340077 | A1 | 12/2013 | Salsamendi et al. | |
| 2014/0006803 | A1 | 1/2014 | Bodis et al. | |
| 2014/0032920 | A1 | 1/2014 | Gehrmann et al. | |
| 2014/0075522 | A1 | 3/2014 | Paris et al. | |
| 2014/0075568 | A1 | 3/2014 | Sathyadevan et al. | |
| 2014/0215461 | A1* | 7/2014 | Laor et al. | 718/1 |
| 2014/0310704 | A1 | 10/2014 | Cantu | |
| 2014/0325644 | A1* | 10/2014 | Oberg et al. | 726/22 |
| 2014/0380425 | A1* | 12/2014 | Lockett et al. | 726/4 |
| 2015/0199518 | A1* | 7/2015 | Tokumoto | |

OTHER PUBLICATIONS

Office Action dated Oct. 7, 2015 in connection with U.S. Appl. No. 14/101,166, 23 pages.

Advisory Action dated Aug. 16, 2015 in connection with U.S. Appl. No. 14/101,166, 7 pages.

Final Office Action dated May 19, 2016 in connection with U.S. Appl. No. 14/101,166, 38 pages.

International Search Report dated Sep. 26, 2013 in connection with International Patent Application No. PCT/US2013/046481, 5 pages.

Written Opinion of International Searching Authority dated Sep. 26, 2013 in connection with International Patent Application No. PCT/US2013/046481, 7 pages.

Litty, et al.; "Manitou: A Layer-Below Approach to Fighting Malware"; Dept of Computer Science, University of Toronto; Oct. 21, 2006; XP055079350; pp. 6-11.

Specification titled "Methods and Apparatuses for Monitoring Activities of Virtual Machines" filed May 7, 2013; U.S. Appl. No. 13/888,849; 16 pages.

Specification titled "Secure Cloud Hypervisor Monitor" filed Feb. 19 2013; U.S. Appl. No. 13/770,664; 19 pages.

Raytheon Pikewerks Corporation; Second Look; 2013; http//secondlookforensics.com/; 28 pages.

Non-Final Office Action dated Sep. 25, 2015 in connection with U.S. Appl. No. 14/101,257; 11 pages.

\* cited by examiner

TECHNIQUE FOR HYPERVISOR-BASED FIRMWARE ACQUISITION AND ANALYSIS

TECHNICAL FIELD

This disclosure is generally directed to computing security. More specifically, this disclosure is directed to a technique for hypervisor-based firmware acquisition and analysis.

BACKGROUND

Computing clouds are increasingly used to provide computing services to client devices. A computing cloud could be used by an organization to provide computing services to internal users of that organization and/or to external users and organizations. In a conventional computing cloud, multiple computing nodes are connected together in a network, and each computing node can execute a "hypervisor." A hypervisor is software and/or hardware that is used to create and manage virtual machines. Each hypervisor supports a virtualization layer, and one or more virtual machines can be executed within the virtualization layer by each computing node. A virtual machine could include an operating system (referred to as a "guest" operating system) and one or more additional software applications that provide desired functionality. It is possible for a single computing node in a computing cloud to execute one or more virtual machines, including multiple virtual machines associated with different guest operating systems.

As is typical with computing clouds, specific virtual machines are not usually bound to particular computing nodes. Rather, each time a client device requests execution of a specific virtual machine, a computing node with adequate resources within the computing cloud could be selected to execute that specific virtual machine.

Security is a constant concern in cloud computing environments. If a vulnerability within a computing node is detected and exploited, any virtual machine executed on that computing node could become compromised. This might allow, for example, illicit access to confidential information within a computing cloud.

SUMMARY

This disclosure provides a technique for hypervisor-based firmware acquisition and analysis.

In a first embodiment, a method includes detecting a triggering event at a hypervisor, where the hypervisor is executed by a computing node. The method also includes capturing, from a memory device of the computing node using the hypervisor, one or more images of a basic input/output system (BIOS) of the computing node and/or a firmware of the computing node. The method further includes analyzing the one or more images to detect a problem with the computing node and taking at least one action in response to detecting the problem with the computing node. The one or more images are obtained by the hypervisor directly from the memory device.

In a second embodiment, an apparatus includes at least one memory and at least one processing device configured to execute a hypervisor. The at least one processing device is configured when executing the hypervisor to detect a triggering event and capture, from the at least one memory, one or more images of a BIOS of the apparatus and/or a firmware of the apparatus. The at least one processing device is also configured when executing the hypervisor to analyze the one or more images to detect a problem with the apparatus and take at least one action in response to detecting the problem with the apparatus. The hypervisor is configured to obtain the one or more images directly from the at least one memory.

In a third embodiment, a non-transitory computer readable medium stores computer readable program code. The computer readable program code when executed causes a computing node to detect a triggering event at a hypervisor and capture, directly from a memory device of the computing node using the hypervisor, one or more images of a BIOS of the computing node and/or a firmware of the computing node. The computer readable program code when executed also causes the computing node to analyze the one or more images to detect a problem with the computing node and take at least one action in response to detecting the problem with the computing node.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
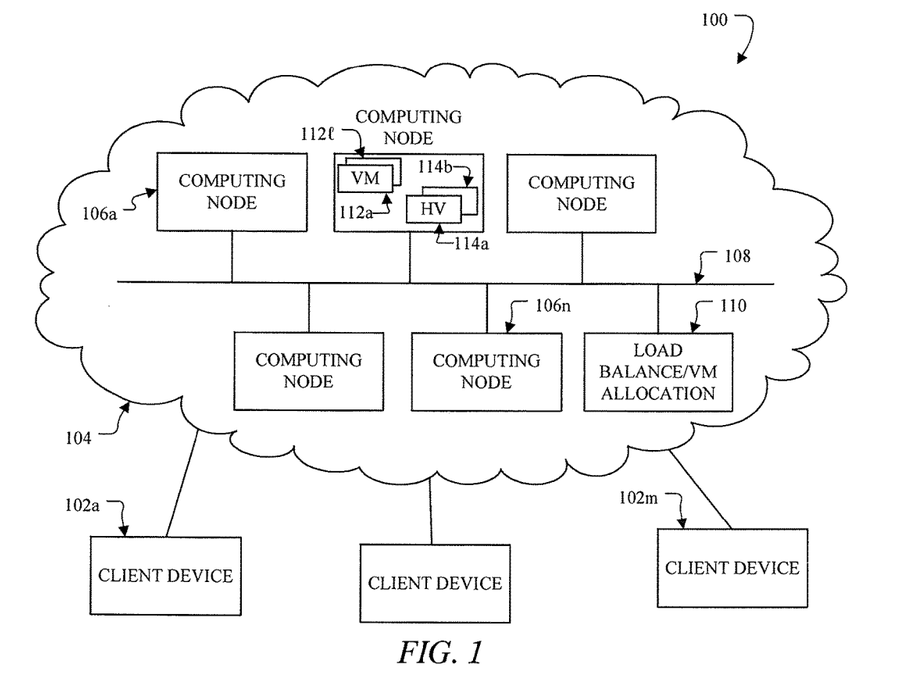
FIG. 1 illustrates an example system with a computing cloud in accordance with this disclosure.

FIG. 1 illustrates an example system 100 with a computing cloud in accordance with this disclosure. The embodiment of the system 100 shown in FIG. 1 is for illustration only. Other embodiments of the system 100 could be used without departing from the scope of this disclosure.

As shown in FIG. 1, the system 100 includes client devices 102a-102m that communicate with or form a part of a computing cloud 104. The client devices 102a-102m represent computing or communication devices that can interact with the computing cloud 104 in order to receive one or more computing services from the computing cloud 104. Any suitable client devices 102a-102m could be used in the system 100, such as desktop computers, laptop computers, tablet computers, dummy computer terminals, smartphones, and any other or additional devices that possess processing and communication capabilities. Any number of client devices could be used in the system 100.

The computing cloud 104 generally represents a cloud computing environment where applications and other software routines are executed to provide computing services to the client devices 102a-102m. The computing cloud 104 typically includes various processing devices that execute instructions in applications and other software routines. The computing cloud 104 also typically includes memory resources used to store data, network interface resources used to communicate over one or more networks, and other computing resources. An application or other software routine could be executed by a single machine within the computing cloud 104 or by multiple machines in the computing cloud 104.

In the example shown in FIG. 1, the computing cloud 104 includes multiple computing nodes 106a-106n coupled together using at least one network 108. The computing cloud 104 also includes at least one load balancing/VM allocation server 110 coupled to the at least one network 108. The computing nodes 106a-106n represent server computers or other type(s) of computing devices that execute applications and other software routines. As described in more detail below, each of the computing nodes 106a-106n can execute one or more virtual machines (VMs) 112a-112l, within a virtualization layer that is supported by multiple hypervisors (HVs) 114a-114b.

Each computing node 106a-106n includes any suitable computing resources that can be used to support the execution of applications such as virtual machines 112a-112l, and hypervisors 114a-114b. For example, each computing node 106a-106n could include one or more processing devices, one or more memories, and one or more network interfaces.

The at least one network 108 facilitates communication between the computing nodes 106a-106n and other components of the system 100, such as the client devices 102a-102m. For example, the network(s) 108 may communicate Internet Protocol (IP) packets, frame relay frames, Asynchronous Transfer Mode (ATM) cells, or other information between network addresses. The network(s) 108 may include one or more local area networks (LANs), metropolitan area networks (MANs), wide area networks (WANs), all or a portion of a global network such as the Internet, or any other communication system or systems at one or more locations. Any number of networks 108 in any suitable configuration could be used. For instance, the client devices 102a-102m could access the computing cloud 104 over a public network such as the Internet, while the computing nodes 106a-106n and other components of the computing cloud 104 could communicate over one or more private LANs or other private networks.

The at least one load balancing/VM allocation server 110 performs various functions that support the use or operation of the computing cloud 104. For example, the load balancing/VM allocation server 110 can perform load balancing to distribute workloads across the computing nodes 106a-106n. Part of this functionality can include the load balancing/VM allocation server 110 selecting the computing nodes 106a-106n that are to execute various virtual machines 112a-112l, requested by the client devices 102a-102m. The load balancing/VM allocation server 110 includes any suitable structure for managing or controlling the workload on multiple devices.

Each virtual machine 112a-112l represents a virtualized computer or other software-based virtualization of a machine that can be executed for or on behalf of at least one client device 102a-102m. Each virtual machine 112a-112l could include a guest operating system and one or more additional software applications. Example guest operating systems could include LINUX, HP-UX, MICROSOFT WINDOWS SERVER, and other operating systems. Other applications within a virtual machine 112a-112l could include any suitable applications that provide desired functionality for the client devices 102a-102m. Each virtual machine 112a-112l could include one or multiple applications.

The hypervisors 114a-114b in each computing node 106a-106n generally operate to support the creation of a virtualization layer to support the execution of one or more virtual machines 112a-112l and to oversee the integrity of the virtualization layer. For example, the hypervisors 114a-114b can operate to virtualize the hardware resources of a computing node 106a-106n on which the virtual machines 112a-112l are executed. This allows the virtual machines 112a-112l, to execute on different computing nodes 106a-106n with little or no regard for the different hardware configurations and resources of the computing nodes 106a-106n.

As described in more detail below, a computing node could include both a monitoring hypervisor 114a and an additional hypervisor 114b. The additional hypervisor 114b can support the virtualization layer and interact with hardware resources of the computing node. The monitoring hypervisor 114a can perform functions to help verify the integrity of the basic input/output system (BIOS) and firmware of the underlying computing node 106a-106n. For example, the monitoring hypervisor 114a could have direct access to the memory device in which the BIOS and firmware are stored, and the monitoring hypervisor 114a could obtain a copy of the BIOS and firmware. Using the copy, the monitoring hypervisor 114a can analyze the instructions in the BIOS and firmware to detect a problem with the underlying computing node 106a-106n.

By performing these functions, the monitoring hypervisor 114a can be used to help verify that the BIOS and firmware of a computing node are secure. For example, the monitoring hypervisor 114a could determine whether the BIOS or firmware contains a signature of malware that may have infected the computing node 106a-106n. In conventional computing devices, a BIOS or firmware inspection can typically occur only during a bootup procedure when the computing devices is restarting operation. In contrast, the monitoring hypervisor 114a enables more frequent monitoring of the BIOS and firmware of a computing node 106a-106n, even when the computing node is in an operational state (such as when the computing node 106a-106n is executing the hypervisors and virtual machines). As a result, the monitoring hypervisor 114a can provide a greater level of protection for the computing node.

Moreover, the monitoring hypervisor 114a can test a computing node's BIOS and firmware multiple times, such as periodically, randomly, or in response to specified events. The specified events could include a request or command to create or execute a virtual machine 112a-112l. In response, the monitoring hypervisor 114a could test the underlying computing node's BIOS and firmware and then initiate creation or execution of a virtual machine only if the test of the BIOS and firmware is satisfactory. This enables the creation and execution of virtual machines 112a-112l on more-trusted computing platforms.

Although FIG. 1 illustrates one example of a system 100 with a computing cloud 104, various changes may be made to FIG. 1. For example, the system 100 could include any number of each component in any suitable arrangement. Cloud computing networks can vary widely in configuration, and FIG. 1 does not limit the scope of this disclosure to any particular configuration. While FIG. 1 illustrates one operational environment in which the BIOS and/or firmware of a computing node can be verified, this functionality could be used in any other suitable system.

Figure 2:
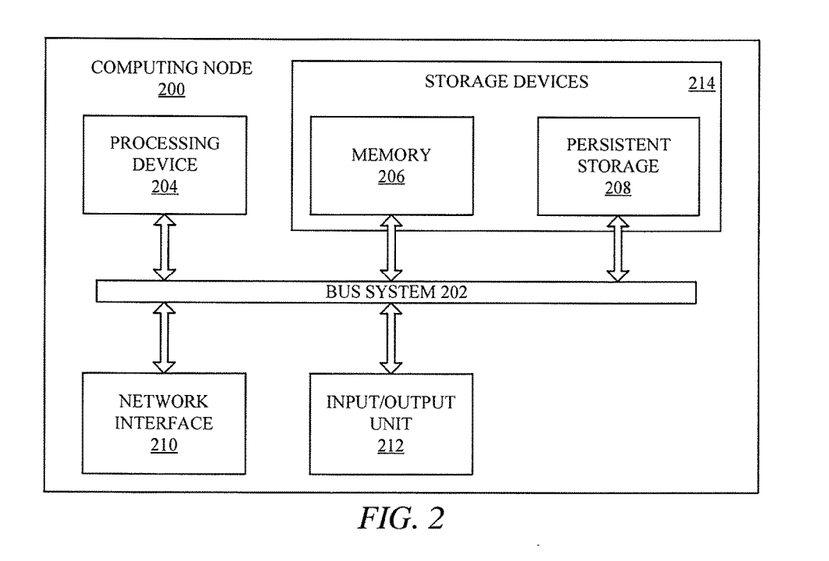
FIG. 2 illustrates an example computing node within a computing cloud in accordance with this disclosure.

FIG. 2 illustrates an example computing node 200 within a computing cloud in accordance with this disclosure. The computing node 200 could, for example, be used as the computing nodes 106a-106n in the system 100 of FIG. 1. The embodiment of the computing node 200 shown in FIG. 2 is for illustration only. Other embodiments of the computing node 200 could be used without departing from the scope of this disclosure.

As shown in FIG. 2, the computing node 200 includes a bus system 202, which supports communication between at least one processing device 204, at least one memory 206, at least one persistent storage device 208, and at least one network interface 210. At least one input/output (I/O) unit 212 could optionally be provided at the computing node 200, although the computing node 200 could also be accessed and used remotely (such as via a network interface 210) without the need for a local I/O unit 212.

The at least one processing device 204 processes instructions in software or firmware, such as software that is loaded into the memory 206. The processing device(s) 204 may include one or more microprocessors, multi-core processors, microcontrollers, field programmable gate arrays, application specific integrated circuits, discreet logic, or other type(s) of processing device(s) depending on the implementation. As a particular example, the processing devices 204 may be implemented using a number of heterogeneous processor systems in which a main processor is present with secondary processors on a single chip. As another particular example, the processing devices 204 may be a symmetric multi-processor system containing multiple processors of the same type.

The at least one memory 206 and the at least one persistent storage device 208 are examples of storage devices 214. A storage device is any piece of hardware capable of storing information, such as data, program code, and/or other suitable information on a temporary or permanent basis. The memory or memories 206 here may include, for example, a random access memory or any other suitable volatile and/or non-volatile storage device(s). The persistent storage device(s) 208 may contain one or more components or devices such as a read-only memory, hard drive, Flash memory, optical drive, or any other type(s) of persistent storage device(s). The media used by a persistent storage device 208 may be removable, such as when a removable hard drive is used as the persistent storage device 208.

The at least one network interface 210 supports communication with other systems or devices. For example, a network interface 210 could include a network interface card or a wireless transceiver. A network interface 210 may support the exchange of any suitable information, such as data associated with execution of a virtual machine or a hypervisor. Each network interface 210 may support communication through one or more physical or wireless communications links.

The at least one I/O unit 212 allows for input and/or output of data using other devices that may be connected to the computing node 200. For example, an I/O unit 212 may provide a connection for user input through a keyboard, mouse, or other suitable input device(s). The I/O unit 212 may also send output data to a display, printer, or other suitable output device(s).

Program code for an operating system, applications, or other programs can be stored in one or more of the storage devices 214, provided to the processing device(s) 204, and executed by the processing device(s) 204. The applications executed by the processing device(s) 204 can include applications implementing hypervisors and virtual machines. Example details regarding the use of hypervisors and virtual machines are described below with respect to FIGS. 3 and 4. These details can be implemented within the computing node 200.

Although FIG. 2 illustrates one example of a computing node 200 within a computing cloud, various changes may be made to FIG. 2. For example, as with computing clouds, computing nodes can vary widely in configuration, and FIG. 2 does not limit the scope of this disclosure to any particular configuration. While FIG. 2 illustrates one example of a computing node that can operate within a cloud computing environment, any other suitable computing node(s) could be used.

Figure 3:
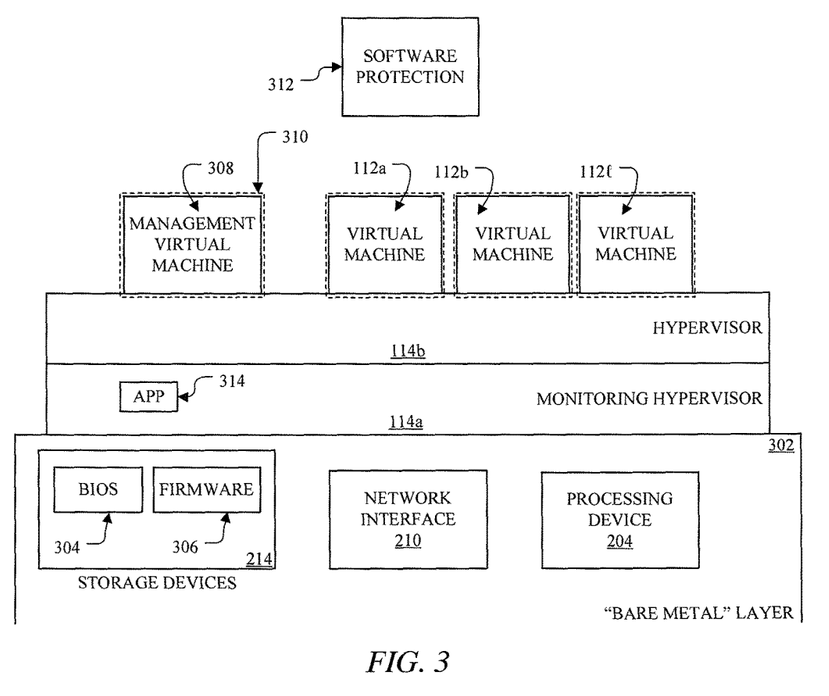
FIG. 3 illustrates an example functional architecture supporting a technique for hypervisor-based firmware acquisition and analysis in accordance with this disclosure.

FIG. 3 illustrates an example functional architecture 300 supporting a technique for hypervisor-based firmware acquisition and analysis in accordance with this disclosure. The embodiment of the functional architecture 300 shown in FIG. 3 is for illustration only. Other embodiments of the functional architecture could be used without departing from the scope of this disclosure. Also, for ease of explanation, the functional architecture 300 shown in FIG. 3 is described with respect to the computing node 200 of FIG. 2 operating in the system 100 of FIG. 1. The functional architecture 300 shown in FIG. 3 could be used with any other computing node and in any other system.

As shown in FIG. 3, a "bare metal" layer 302 represents the physical computing resources of an underlying computing node 200. The "bare metal" layer 302 here includes the various processing devices 204, storage devices 214, and network interfaces 210 of the computing node 200. The "bare metal" layer 302 could include any other computing resources in a computing cloud or a computing node.

The monitoring hypervisor 114a and the additional hypervisor 114b are executed by or otherwise implemented with the computing node 200. The hypervisor 114b generally supports the creation and management of a virtualization layer in which one or more virtual machines can be executed. The hypervisor 114b also generally supports interactions between those virtual machines and the computing resources in the underlying "bare metal" layer 302.

The monitoring hypervisor 114a can monitor the operation of the virtual machine(s) and the hypervisor 114b to thereby oversee the integrity of the virtualization layer. For example, the monitoring hypervisor 114a could capture memory snapshots of the memory space used by one or more virtual machines 112a-112l to support real-time behavior-based malware detection. Details of example monitoring hypervisors and example techniques for detecting malware using monitoring hypervisors can be found in U.S. patent application Ser. No. 13/770,664 and U.S. patent application Ser. No. 13/888,849, both of which are hereby incorporated by reference in their entirety. In this example, the monitoring hypervisor 114a can logically operate between the bare metal layer 302 and the hypervisor 114b.

The monitoring hypervisor 114a can also verify the integrity of the underlying "bare metal" layer 302. For example, the monitoring hypervisor 114a could obtain copies of BIOS 304 and firmware 306 from one or more of the storage devices 214. The monitoring hypervisor 114a could then analyze the copies to detect signatures of malware or other security problems with the computing node 200. As a particular example, the monitoring hypervisor 114a could perform hashing operations using images of the BIOS 304 and firmware 306 and compare the results to hash results associated with known good images of the BIOS 304 and firmware 306.

Each hypervisor 114a-114b can be implemented in any suitable manner. For example, each hypervisor 114a-114b could include software/firmware instructions executed by at least one processing device. In some embodiments, each hypervisor 114a-114b represents a "Type 1" or "Type 2" hypervisor. A "Type 1" hypervisor represents a hypervisor run or executed directly on the underlying hardware of a computing node in order to control the hardware. A "Type 2" hypervisor represents a hypervisor run or executed between the operating system of a computing node and one or more guest operating systems in one or more virtual machines. In other words, a "Type 2" hypervisor runs within the environment created by the operating system of a computing node, while a "Type 1" hypervisor is not limited in this manner. Examples of available hypervisors that could be used as the hypervisor 114a and/or the hypervisor 114b (after augmented to support the functionality described in this patent document) include the XEN hypervisor from CITRIX SYSTEMS, INC., the ESXI hypervisor from VMWARE, INC., and the KVM hypervisor from RED HAT, INC.

In particular embodiments, the hypervisor 114a is implemented as a "Type 1" hypervisor that obtains images of the BIOS 304 and firmware 306 directly from the storage device(s) 214. As a result, the images need not pass through any other intervening applications (such as an operating system) before reaching the monitoring hypervisor 114a. This can help to prevent an intervening application from maliciously altering the images in order to hide the presence of malware or other security risk.

In the example shown in FIG. 3, different types of virtual machines are executed on the computing node 200. For example, the computing node 200 could execute the one or more virtual machines 112a-112l. The virtual machines 112a-112l represent virtual machines used to provide one or more services to the client devices 102a-102m. The virtual machines 112a-112l, could be created and controlled by the organization operating the computing cloud 104, by the owners/operators of the client devices 102a-102m, or in any other suitable manner. Each virtual machine 112a-112l can include a guest operating system and one or more applications.

The computing node 200 could also execute a management virtual machine 308. The management virtual machine 308 can perform various functions used to manage the operation of the computing node 200. The functions of the management virtual machine 308 may not necessarily be intended to directly provide functionality to the client devices 102a-102m but rather to manage the computing node 200 or support execution of the virtual machines 112a-112l. Example management functions could include memory management and network management.

The dashed lines 310 around the virtual machines in FIG. 3 represent encryption protection provided to the virtual machines by a software protection module 312. One, some, or all of the virtual machines executed by the computing node 200 could receive software protection. The software protection module 312 can be used to help provide clean and secure guest operating systems to the client devices 102a-102m and to protect the confidentiality and integrity of the virtual machines. Any suitable encryption technology could be used. In some embodiments, the software protection module 312 could include software or firmware executed in any suitable manner, such as directly on the bare metal layer 302, within the monitoring hypervisor 114a, within the hypervisor 114b, within the virtual machines 112a-112l, or as a separate virtual machine.

As shown in FIG. 3, the monitoring hypervisor 114a includes an analysis application 314. The analysis application 314 analyzes copies of the BIOS 304 and firmware 306 obtained by the monitoring hypervisor 114a from the underlying bare metal layer 302 and determines if any problems with the computing node 200 are detected. The results of a BIOS/firmware test could be used solely by the monitoring hypervisor 114a, solely by another component (such as a virtual machine), or by a combination of components. For example, the monitoring hypervisor 114a could shut down execution of any virtual machines 112a-112l, trigger an alarm, or perform any other suitable action(s) in response to an unsatisfactory test result. As another example, a virtual machine 112a-112l, could shut itself down or block execution of one or more functions in response to a notification from the monitoring hypervisor 114a of an unsatisfactory test result.

Figure 4:
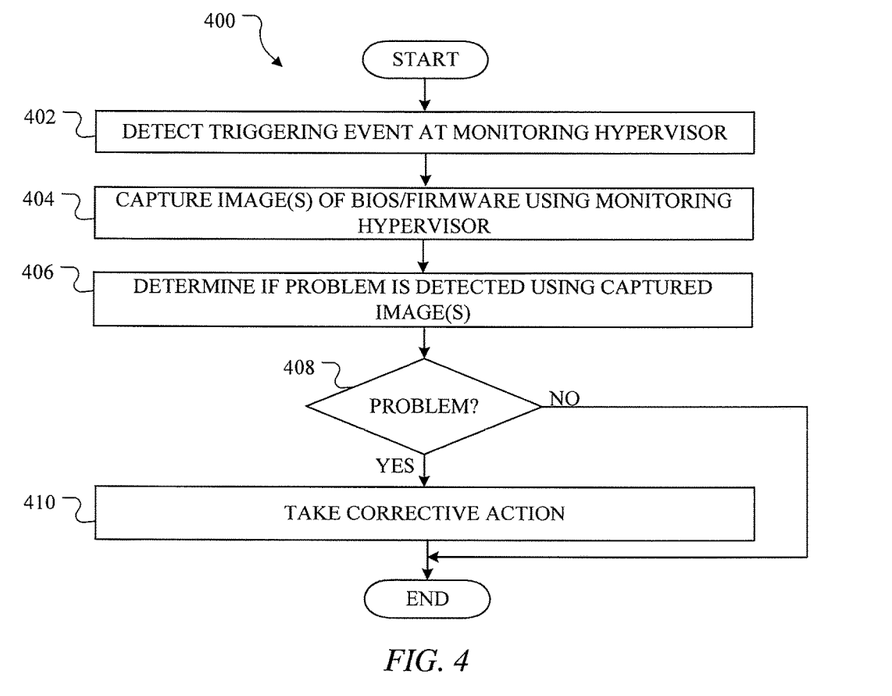
FIG. 4 illustrates an example method for hypervisor-based firmware acquisition and analysis in accordance with this disclosure.

Additional details regarding the operation of the analysis application 314 and the monitoring hypervisor 114a in a computing node 200 are shown in FIG. 4. Note that the various components shown in FIG. 3 could be implemented in any suitable manner. For example, each of the components 112a-112l, 114a-114b, 304-308, 312-314 could be implemented using software/firmware that is executed by the processing device(s) 204 of the computing node 200.

Although FIG. 3 illustrates one example of a functional architecture 300 supporting a technique for hypervisor-based firmware acquisition and analysis, various changes may be made to FIG. 3. For example, the computing node 200 could include any number(s) and type(s) of resources in the bare metal layer 302, and the computing node 200 could execute any number(s) and type(s) of virtual machines. Also, while the verification of both the BIOS 304 and the firmware 306 of a computing node is described here, the monitoring hypervisor 114a could verify one or the other.

FIG. 4 illustrates an example method 400 for hypervisor-based firmware acquisition and analysis in accordance with this disclosure. More specifically, FIG. 4 illustrates an example method 400 that could be performed by the monitoring hypervisor 114a of a computing node. The embodiment of the method 400 shown in FIG. 4 is for illustration only. Other embodiments of the method 400 could be used without departing from the scope of this disclosure. Also, for ease of explanation, the method 400 is described with respect to the computing node 200 of FIG. 2 using the functional architecture 300 of FIG. 3 and operating in the system 100 of FIG. 1. The method 400 could be used with any other computing node, functional architecture, and system.

As shown in FIG. 4, a triggering event is detected at a monitoring hypervisor at step 402. This could include, for example, the application 314 in the monitoring hypervisor 114a receiving a request to create, modify, or execute a virtual machine 112a-112l. This could also include the application 314 in the monitoring hypervisor 114a detecting passage of a specified amount of time or detecting a request to verify a computing node from a user or an application. The application could represent an application executing within a virtual machine 112a-112l, and the request could be verified prior to execution of the request. Any other or additional type(s) of triggering event(s) could be detected at the monitoring hypervisor 114a.

Note that in step 402, a request for hypervisor-based firmware acquisition and analysis could be verified in any suitable manner. For instance, the monitoring hypervisor 114a could perform an authentication operation with a virtual machine 112a-112l or an application in the virtual machine 112a-112l, such as when the virtual machine or application provides a digital certificate or a pointer identifying a digital certificate. The monitoring hypervisor 114a could also determine whether the request was obtained from a memory address "owned" by the virtual machine 112a-112l or an application in the virtual machine 112a-112l. The monitoring hypervisor 114a could further examine an instruction pointer of the processing device 204 and determine if the processing device 204 was executing code of the virtual machine 112a-112l or an application in the virtual machine 112a-112l at the time that the request was received.

One or more images of the BIOS and/or firmware of a computing node are captured by the monitoring hypervisor at step 404. This could include, for example, the application 314 in the monitoring hypervisor 114a reading the memory space associated with at least one of the BIOS 304 and the firmware 306. The monitoring hypervisor 114a here can read the memory space directly from a memory device without the data passing through any other intervening applications.

A determination is made whether a problem is detected using the image(s) at step 406. If no problem is detected at step 408, the method 400 could end. In this case, the image(s) could be discarded or saved for later use. Otherwise, if a problem is detected at step 408, corrective action can be taken at step 410. This could include, for example, the application 314 requesting that the monitoring hypervisor 114a disable or stop execution of one or more virtual machines, generating a warning for an operator, or triggering an alarm.

Any suitable analysis of a BIOS image or a firmware image could occur in step 406. For example, the analysis application 314 could perform a hashing operation using a BIOS or firmware image and compare the hash result to hashes of known "good" BIOS or firmware images. If a match is not found, this could indicate that changes have been made to the underlying BIOS or firmware. The analysis application 314 could also inspect various aspects of the BIOS or firmware to determine whether any anomalous conditions are detected. For instance, the analysis application 314 could inspect firmware 306 to determine whether all components of the firmware 306 are associated with the same vendor, such as by using a vendor signature. If not, this could indicate that a portion of the firmware 306 has been replaced. As a particular example, it would be suspicious if a HEWLETT PACKARD driver is found in firmware 306 when all other components of the firmware 306 are associated with a DELL, INC. signature. As yet other examples, the application 314 could determine whether firmware 306 was compiled using an expected compiler, is performing the functions normally expected of firmware, or has any other suitable characteristics. Any other or additional analyses could be performed by the analysis application 314, whether or not those analyses involve hashing operations.

A known "good" state of a BIOS or firmware image could be identified in any suitable manner. For example, the monitoring hypervisor 114a could be instructed by an administrator or other user to capture images of the current BIOS 304 and firmware 306 when the computing node 200 is operating in a known good state. The hypervisor 114a could also have access to reference hash results for different images of known good BIOS images and known good firmware images, and the hypervisor 114a could compare hash results for the current BIOS or firmware image to the reference hash results. Hashes for a large number of good BIOS images and firmware images could be supported by the analysis application 314.

In this manner, the monitoring hypervisor 114a can obtain images of BIOS or firmware instructions directly from a memory of a computing node. This reduces or eliminates the likelihood that a malicious program could effectively "hide itself" by returning false images a computing node's memory space. Moreover, the method 400 shown in FIG. 4 could occur at any suitable time, including during normal runtime operation of the computing node 200. This allows the monitoring hypervisor 114a to verify the BIOS and firmware of the underlying computing node 200 at any suitable time, not merely during bootup operations.

Although FIG. 4 illustrates one example of a method 400 for hypervisor-based firmware acquisition and analysis, various changes may be made to FIG. 4. For example, while shown as a series of steps, various steps in FIG. 4 could overlap, occur in parallel, occur in a different order, or occur any number of times.

In some embodiments, various functions described above (such as functions of the various hypervisors, software protection modules, and virtual machines) are implemented or supported by computer programs, each of which is formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    detecting a triggering event at a hypervisor, the hypervisor executed by a computing node;
    capturing, by the hypervisor from a memory device of the computing node, one or more images of at least one of: a basic input/output system (BIOS) of the computing node and a firmware of the computing node;
    analyzing the one or more images to detect a problem with the computing node; and
    taking at least one action in response to detecting the problem with the computing node;
    wherein the one or more images are captured by the hypervisor directly from the memory device without having data defining the one or more images pass through any intervening application.

2. The method of claim 1, wherein analyzing the one or more images comprises:
    performing a hashing operation of at least one of the one or more images; and
    comparing results of the hashing operation against hash results associated with one or more known good images of the BIOS or firmware.

3. The method of claim 1, wherein analyzing the one or more images comprises:
    determining whether different portions of the BIOS or firmware are associated with different vendors.

4. The method of claim 1, wherein the triggering event comprises a request to create, modify, or execute a virtual machine on the computing node.

5. The method of claim 1, wherein the triggering event comprises a request from an authorized application executing within a virtual machine on the computing node.

6. The method of claim 1, wherein the detecting, capturing, analyzing, and taking occur repeatedly while the computing node is in an operational state after bootup.

7. The method of claim 1, wherein the hypervisor is a first hypervisor, and the triggering event is associated with execution of a virtual machine managed by a second hypervisor executed by the computing node.

8. An apparatus comprising:
    at least one memory; and
    at least one processing device configured to execute a hypervisor, wherein the at least one processing device is configured when executing the hypervisor to:
        detect a triggering event;
        capture, from the at least one memory, one or more images of at least one of: a basic input/output system (BIOS) of the apparatus and a firmware of the apparatus;
        analyze the one or more images to detect a problem with the apparatus; and
        take at least one action in response to detecting the problem with the apparatus;
    wherein the hypervisor is configured to capture the one or more images directly from the at least one memory without having data defining the one or more images pass through any intervening application.

9. The apparatus of claim 8, wherein the at least one processing device is configured to analyze the one or more images by:
    performing a hashing operation of at least one of the one or more images; and
    comparing results of the hashing operation against hash results associated with one or more known good images of the BIOS or firmware.

10. The apparatus of claim 8, wherein the at least one processing device is configured to analyze the one or more images by determining whether different portions of the BIOS or firmware are associated with different vendors.

11. The apparatus of claim 8, wherein the triggering event comprises a request to create, modify, or execute a virtual machine on the apparatus.

12. The apparatus of claim 8, wherein the at least one processing device is configured to detect the triggering event, capture the one or more images, analyze the one or more images, and take the at least one action repeatedly while the apparatus is in an operational state after bootup.

13. The apparatus of claim 8, wherein the at least one processing device is configured to take the at least one action by disabling or stopping execution of one or more virtual machines by the apparatus.

14. The apparatus of claim 8, wherein the apparatus comprises a computing node configured to operate within a computing cloud.

15. A non-transitory computer readable medium storing computer readable program code that when executed causes a computing node to:
    detect a triggering event at a hypervisor;
    capture, by the hypervisor directly from a memory device of the computing node, one or more images of at least one of: a basic input/output system (BIOS) of the computing node and a firmware of the computing node without having data defining the one or more images pass through any intervening application;
    analyze the one or more images to detect a problem with the computing node; and
    take at least one action in response to detecting the problem with the computing node.

16. The computer readable medium of claim 15, wherein the computer readable program code that when executed causes the computing node to analyze the one or more images comprises computer readable program code that when executed causes the computing node to:
    perform a hashing operation of at least one of the one or more images; and
    compare results of the hashing operation against hash results associated with one or more known good images of the BIOS or firmware.

17. The computer readable medium of claim 15, wherein the computer readable program code that when executed causes the computing node to analyze the one or more images comprises computer readable program code that when executed causes the computing node to determine whether different portions of the BIOS or firmware are associated with different vendors.

18. The computer readable medium of claim 15, wherein the triggering event comprises a request to create, modify, or execute a virtual machine on the computing node.

19. The computer readable medium of claim 15, wherein the computer readable program code when executed causes the computing node to detect the triggering event, capture the one or more images, analyze the one or more images, and take the at least one action repeatedly while the computing node is in an operational state after bootup.

20. The computer readable medium of claim 15, wherein the computer readable program code that when executed causes the computing node to take the at least one action comprises computer readable program code that when executed causes the computing node to disable or stop execution of one or more virtual machines by the computing node.

* * * * *